United States Patent [19]
Johnson

[11] 4,075,156
[45] Feb. 21, 1978

[54] PRODUCTION OF NON-CARCINOGENIC LARGE PARTICLE CARBON BLACK

[75] Inventor: Paul H. Johnson, Bartlesville, Okla.

[73] Assignee: Phillips Petroleum Company, Bartlesville, Okla.

[21] Appl. No.: 681,974

[22] Filed: Apr. 30, 1976

[51] Int. Cl.² ............................................. C08K 3/04
[52] U.S. Cl. ............................ 260/42.47; 260/42.48; 423/445; 423/450; 423/460
[58] Field of Search ............ 260/37, 40, 42.46, 42.47, 260/42.48; 423/445, 450, 456, 460

[56] References Cited

U.S. PATENT DOCUMENTS

| 2,686,107 | 8/1954 | Jordan | 423/450 X |
| 3,102,005 | 8/1963 | Dye | 423/450 X |
| 3,290,791 | 12/1966 | Keaton | 423/450 X |
| 3,409,406 | 11/1968 | Murray | 423/455 X |
| 3,523,812 | 8/1970 | Kraus | 106/307 |
| 3,761,577 | 9/1973 | Dahmen et al. | 423/450 |

Primary Examiner—Lewis T. Jacobs

[57] ABSTRACT

A non-carcinogenic large particle carbon black both produced by severely aftertreating a carbon black-containing smoke to result in a carbon black with a photelometer of 100% and a pitting value (nitrogen surface area minus CTAB surface area) of about 0.2 m²/g or more to 7 m²/g or more for a carbon black of 30 m²/g to 80 m²/g CTAB surface area, oxidizing the black as well as by high temperature drying the wet pelleted carbon black at a temperature of about 500° to 600° F. The CTAB surface area of the carbon black is less than 80 m²/g and preferably about 30 to 60 m²/g.

7 Claims, No Drawings

PRODUCTION OF NON-CARCINOGENIC LARGE PARTICLE CARBON BLACK

This invention relates to carbon black. More specifically this invention relates to non-carcinogenic carbon black. In one of its aspects, this invention relates to the production of a non-carcinogenic carbon black. Yet another aspect of this invention relates to a polymer composition containing such a non-carcinogenic carbon black.

BACKGROUND OF THE INVENTION

It is well known in the art that carbon black can be produced by pyrolytic decomposition of various hydrocarbon feedstocks. The carbon black produced in furnaces is most widely used in tires as reinforcing agents for rubber. Carcinogenic materials in extremely small quantities that might occur in such carbon blacks do not constitute a problem there.

If, however, carbon black is to be used either as a food ingredient or in applications where it gets in contact with food, such as in wrapping materials, or plastic pipes, or rubber hoses that come into contact with food materials or ingredients for food, the product is subject to rigid controls and has to pass certain tests before its use in these applications is approved. One of the problems is that extremely small but still detectable quantities of condensed aromatics can be present in carbon blacks. Benzo (a) pyrene is an example of a known carcinogen among the many condensed aromatic ring structures. It would thus be desirable to have a process available by which a carbon black being essentially free of such materials, in particular being free of benzo (a) pyrene, can be produced.

THE INVENTION

It is thus one object of this invention to provide a process for the production of a non-carcinogenic carbon black.

Another object of this invention is to provide a non-carcinogenic carbon black having a very low content in benzene extractables.

A further object of this invention is to provide a polymer composition comprising a non-carcinogenic carbon black.

Yet another object of this invention is to provide a polymer pipe containing non-carcinogenic carbon black.

These and other objects, advantages, details, features and embodiments of this invention will become apparent to those skilled in the art from the following detailed description of the invention, the appended claims and the examples.

In accordance with this invention, it has now been found that a non-carcinogenic large particle carbon black can be produced by severely aftertreating a smoke containing a carbon black having a CTAB surface area of less than 80 m$^2$/g such as to produce a smoke-containing carbon black of a photelometer value of about 100% and a pitting value being defined as the difference between the nitrogen surface area in square meters per gram and the CTAB surface area in square meters per gram of 0.2 m$^2$/g or more. More specifically, the pitting value as defined is 0.2 m$^2$/g or more for a carbon black of about 30 m$^2$/g CTAB surface area and is 7 m$^2$/g or more for a carbon black with a CTAB surface area of 80 m$^2$/g. The minimal pitting value (N$_2$SA-CTAB SA) in m$^2$/g can be determined for carbon blacks having other CTAB surface areas by interpolation. Further steps of the process of this invention are oxidizing the carbon black and wet pelleting the carbon black with an aqueous pelleting agent and finally drying the wet carbon black pellets at a temperature of about 500° to 600° F. It has been found that this procedure has resulted in a large particle carbon black being free of known carcinogens and having an extremely low overall content of benzene extractables.

In the definitions given above, the nitrogen surface area is determined in accordance with ASTM D-3037-71T, Method A. The CTAB surface area is measured as described by J. Janzen and G. Kraus, in Rubber Chemistry and Technology, 44, 1287 (1971). The photelometer, finally, is determined by the standard procedure ASTM D-1618-58T.

The carbon black made in accordance with the process of the present invention contains less than about 0.05 wt. % of benzene extractables. This weight percentage is based on the dry carbon black as 100%.

The carbon black in accordance with this invention can be produced from any kind of low carbon residue feedstock. The carbon residue content of the feedstock is determined by adding normal pentane to the feedstock, filtering, drying the recovered residue, and weighing the dried residue. The feedstock to be used preferably contains less than 0.2 wt. % of carbon residue. Among the various feedstocks, the highly aromatic feedstocks have the best overall results in the process. Particularly preferred feedstocks are solvent extracted distillates from catalytic cracking of gas oils or residue oils. Especially useful and therefore preferred are SO$_2$ extract oils, toluene and mixtures thereof. An SO$_2$ extract oil is a cracked oil being liquid/liquid extracted using liquid SO$_2$ to concentrate the aromatics in this oil.

The heat necessary for the pyrolytic decomposition of the feedstock can be generated by various means well known in the art. It is presently preferred to combust a fuel with air such as to produce hot combustion gases and to mix these hot combustion gases with the feedstock. Instead of this procedure or in addition thereto, a portion of the feedstock may be combusted to produce hot combustion gases. The oxidant used for the combustion of the fuel or of the combustion of a portion of the feedstock is generally and preferably air or oxygen or oxygen-enriched air.

Some materials can be added to the reaction mixture in the furnace in order to achieve certain special results, as long as these additives do not adversely interfere with the use of the carbon black produced in contact with food. Thus small quantities of up to 20 ppm of potassium can be added to the feedstock, e.g., in the form of potassium chloride, to reduce the structure. Preferably, however, no potassium is added.

The carbon black as defined above can be produced in any of the well known reactors that are useful for the production of a carbon black having the specific surface area properties defined. Preferably the carbon black in the present invention is produced in an A-type carbon black reactor such as the one disclosed in detail in the U.S. Pat. Nos. 2,375,795 3,409,406. From the carbon black-containing smoke leaving this A-type reactor after the severe aftertreatment in the reactor which is to be described in the following, the carbon black is removed. This is done by well known techniques. Most preferably the smoke is passed through elongated filter bags of glass fiber or polytetrafluoroethylene fiber material which are periodically emptied to recover the accumulated flocculent carbon black. This flocculent carbon black then is wet pelleted and dried. The wet pelleting is done by introducing the flocculent carbon black and an aqueous pelleting agent into a pelleter in which a pinned shaft is rotated. The wet carbon black pellets are finally dried at a temperature of about 500° to 600° F. It is preferred to include an oxidizing agent in the pelleting liquid. Hydrogen peroxide and $HNO_3$ are examples for such oxidizing agents.

It is important for this invention to subject the carbon black to a combination of three special treatments. The first treatment is a severe aftertreatment of the carbon black-containing smoke to result in a photelometer of the carbon black of 100% and a pitting degree (nitrogen surface area minus CTAB surface area) expressed in square meters per gram as defined above. The severe aftertreatment is achieved either by a late quench or by a secondary air injection, or by both treatments combined. Quench, as is well known in the art, is the contacting of the carbon black containing hot smoke with a cooling agent such as water or cooled smoke to stop the carbon black from further physical and chemical changes. Late quench herein refers to the deferral of such a quenching step to a location further downstream than the location of normal quenching in order to achieve the 100% photelometer and the high pitting degree as defined by the minimum value for the difference between nitrogen surface area and CTAB surface area. Another possible severe aftertreatment is the injection of secondary air into the reactor downstream of the main carbon black forming zone and upstream of a quench zone. This secondary air injection or afterburning has the same effect as the last quench. Both procedures can be used combined.

The second treatment of the carbon black is an oxidation step. This step as such is also known in the art. Any of the known oxidation procedures can be employed. Preferably the water-soluble oxidant such as hydrogen peroxide or nitric acid — the latter being preferred — is dissolved in the aqueous pelleting liquid. Thus the oxidation occurs in this special embodiment after the pelleting and essentially during the final phase of the drying step. Thus the second and third treatments actually in this embodiment are carried out simultaneously. The preferred method to cause the oxidation of the carbon black is to use an aqueous $HNO_3$ as the pelleting liquid. The quantity of $HNO_3$ present in the pelleting mixture is generally 2-10 wt. % $HNO_3$ based on the weight of carbon black being 100%.

The third treatment of the carbon black is a relatively severe drying step. The carbon black is wet pelleted using any of the known aqueous pelleting liquids. The wet pellets which may contain between 40 and 60% of aqueous pelleting solution, the best essentially carbon black, then are dried so that their temperature is raised at least at the end of the drying zone to a value of about 500° to 600° F, preferably about 500° to 550° F.

In accordance with a further embodiment of this invention, there is provided a polymer composition. The polymer composition of this invention is either a rubber composition or a thermoplastic composition. The rubber composition of this invention consists essentially of 100 parts by weight of rubber and 1 to 200 parts by weight of the carbon black. The thermoplastic polymer composition of this invention consists essentially of 100 parts by weight of thermoplastic polymer material and 0.1 to 50 parts by weight of the carbon black. For certain applications of the plastic polyemr material, e.g, in contact with milk or edible oils, a quantity of 0.1-10 parts by weight of carbon black per 100 parts by weight of the thermoplastic polymer is preferred. The carbon black utilized in these compositions is that carbon black that is obtained by the process of this invention as defined above. Examples for the rubber that can be utilized for the rubber composition of this invention are natural rubber, synthetic rubbers such as polymers of conjugated acyclic alkadienes and copolymers of conjugated acyclic alkadienes with monovinyl arenes, in particular, polybutadienes or butadiene/styrene copolymers, as well as mixtures of such rubbers. The preferred range of carbon black content for the rubber composition of this invention is 20 to 80 parts by weight of carbon black per 100 parts by weight of rubber.

A typical rubber composition useful for hoses and tubing would be essentially composed of the following ingredients in parts by weight:

| | |
|---|---|
| Rubber | 100 |
| Carbon black (in accordance with this invention) | 30-50 |
| Extender oil | 25-45 |
| Standard additives (e.g., antioxidants, etc.) | |

Examples for the plastic polymers useful in compositions of this invention are low-density polyethylene, high-density polyethylene, general-purpose polystyrene, high impact-resistant polystyrene, flexible polyvinyl chloride, rigid polyvinyl chloride, acrylonitrile/butadiene/styrene copolymers, polypropylene, polycarbonates, polyamides such as nylon, phenylformaldehyde resins, epoxy resins, as well as polyurethanes. The preferred range for the carbon black to be incorporated into the thermoplastic compositions is 0.1 to 10, preferably 0.5 to 3 parts by weight of carbon black per 100 parts by weight of thermoplastic polymer.

Yet a further embodiment of this invention resides in a pipe that can be used for transporting materials intended for human consumption. This pipe consists essentially of a plastic or rubber composition as defined above. Preferably this pipe or hose has an outside diameter in the range of ¼ to 12 inches, whereas the wall thickness of this pipe is within the range of 1/16 to ¾ inch. Such a pipe or hose combines the advantages of absorbing any light that might cause deterioration of the materials flowing through this pipe, while at the same time the carbon black contained in this pipe is non-carcinogenic. Particularly advantageous are pipes made from high density polyethylene containing the non-carcinogenic carbon black defined above in quantities shown above. These high density polyethylene pipes are very sturdy and can be readily connected to each other.

The invention will still be more fully understood from the following example which is intended to show a preferred embodiment of this invention but not to limit the scope thereof.

EXAMPLE

In a commercial A-type carbon black reactor as is described in detail in U.S. Pat. No. 3,409,406, large particle carbon black-containing smoke was produced. The reactor was 185 inches in length from the oil inlet to the water quench. The upstream 24 inch length of the reactor was 24 inches in diameter; the last section or downstream section was 28 inches in diameter, and the length from the upstream section outlet to the quench was 161 inches. The first and second sections have the same longitudinal axis. Primary air and fuel were added 4 inches downstream from the oil inlet. Secondary air was added 17 inches downstream from the oil inlet. The carbon black produced was filtered and pelleted with an aqueous $HNO_3$ solution. The wet pellets were thereafter dried. Specifically, the ingredients were injected in the following quantities and their conditions utilized were as shown in the following table:

TABLE I

| | |
|---|---|
| Primary tangential air, MCF/H | 160 |
| Tangential gas, MCF/H | 5 |
| Secondary air, MCF/H | 25 |
| Oil ($SO_2$ extract), gph[1] | 425 |
| Air temperature, °F. | 535 |
| $HNO_3$ addition, wt. % of pelleting liquid (about 1 to 1 weight ratio of carbon black to pelleting solution) | 3.25 |
| Dryer product temperature, °F. | 500–600 |
| MCF/H = Thousand standard cubic feet/hour | |

[1]$SO_2$ extract oil, 680° F. mid-boiling point, BMCI of 94.

The 25 MCF/H of secondary air were injected into the reactor about 17 inches downstream of the oil injection nozzle in order to cause a severe aftertreatment. The tangential gas utilized with primary air was natural gas. Water quench was added 185 inches downstream of the oil injection nozzle. 4,000 SCF/H air was added around axial make oil nozzle. The carbon black obtained was analyzed for its properties and the results of this analysis are shown in the following:

TABLE II

| Physical Properties of the Carbon Black | |
|---|---|
| $N_2SA^{(1)}$ $m^2/g$ | 40.6 |
| $CTAB^{(2)}$ $m^2/g$ | 37.6 |
| Porosity[3] $m^2/g$ | 3.0 |
| $I_2$No.[4] | 34.2 |
| ASTM DBP[5] cc/100 g | 96.1 |
| 24M4 DBP[6] cc/100 g | 74.8 |
| Toluene Photelometer[7] | 100 |
| DPG Value[8] | 17.8 |
| pH[9] | 4.6 |

[1]ASTM-D-3030-71T, Method A;
[2]J. Janzen and G. Kraus, Rubber Chemistry and Technology, 44, 1287 (1971);
[3]$N_2SA$-CTAB) $m^2/g$;
[4]ASTM D-1510-70;
[5]ASTM D-2414-70;
[6]U.S. Pat. No. 3,548,454, as measured after crushing, by Method B, ASTM D-2414-70;
[7]ASTM D-1618-58T.
[8]Number of microequivalents of diphenylguanidine (DPG) adsorbed by 1 gram of black, determined by back-titration of the benzene solution of DPG with standard methanolic HCl, using tetrabromophenylsulfonephthalein as indicator.
[9]ASTM D-1512.

This carbon black thereafter was further tested to determine the contents of polynuclear aromatic and benzene extractables. The results of this test are shown in the following Table III:

TABLE III

| Content of polynuclear aromatics and benzene extractables | |
|---|---|
| Molecular wt. 202[1] | 0.9 ppm by weight |
| Other PNA below Molecular weight about 278[3] | nil[2] |
| Benzo (a) pyrene[3] | nil[2] |
| Benzene extractables (total)[4] | 120 ppm by weight |

[1]Pyrene or fluoranthene.
[2]Lower limit of detectability, approximately 0.05 ppm by weight.
[3]Carcinogen recognized as being in normally produced furnace blacks.
[4]This content of benzene extractables corresponds to 0.012 wt. %.

The above data show that the carbon black produced in accordance with this invention is a large particle carbon black and that the carbon black is essentially free of benzene extractables and in particular free of any detectable benzo (a) pyrene.

EXAMPLE II

A typical recipe for a rubber composition that would be useful for the production of hoses and tubes useful, e.g., for the transportation of milk, is given in the following:

| | |
|---|---|
| Paracril BJ[1] | 40 |
| Philprene™ 1502[2] | 60 |
| Carbon Black | 40 |
| Dioctylphthalate | 32 |
| Zinc Oxide | 3 |
| Stearic Acid | 2 |
| Flexone 3C[3] | 1 |
| Sunproof Superwax[4] | 1 |
| Sulfur | 1.75 |
| Altax[5] | 1.75 |
| Diphenylguanidine | 0.25 |

[1]A commercially available acrylonitrile polymer.
[2]A rubber, commercially available.
[3]An antioxidant.
[4]An anti-crack additive.
[5]An accelerator.

Products made from this composition do not contain carcinogenic materials introduced by the carbon black so that the compositions and the articles made therefrom are useful in food grade applications.

Reasonable variations and modifications which will become apparent to those skilled in the art can be made in the present invention without departing from the spirit and scope thereof.

I claim:

1. A process for the production of a non-carcinogenic large particle carbon black comprising
   a. pyrolytically in a carbon black furnace decomposing a hydrocarbon feedstock having a low carbon residue of less than 0.2 weight % such as to form a smoke containing a carbon black having a CTAB surface area of less than about 80 $m^2/g$,
   b. severly aftertreating said smoke by subjecting it to at least one of the steps of late quenching and secondary air injection such as to produce a smoke containing a carbon black having a photelometer of about 100% and a pitting degree defined as the difference between the nitrogen surface area in square meters per gram and the CTAB surface in square meters per gram of 0.2 $m^2/g$ or more,
   c. oxidizing said carbon black and pelleting the carbon black with an aqueous pelleting liquid, and
   d. drying the wet carbon black pellets at a temperature of about 500° to about 600° F.

2. A process in accordance with claim 1 wherein said feedstock is selected from the group consisting of toluene, $SO_2$ extract oil and mixtures thereof.

3. A process in accordance with claim 1 wherein said carbon black is oxidized by contacting the carbon black with an aqueous solution of $HNO_3$ as the pelleting liquid so that the mixture of carbon black and pelleting liquid contains about 2–10 wt. % of $HNO_3$ based on carbon black as 100%.

4. A process in accordance with claim 1 wherein said aftertreating of said carbon black-containing smoke is carried out by a late quench step and/or by the introduction of secondary air into the furnace between the main carbon black forming reaction zone and a quench location.

5. A non-carcinogenic carbon black obtained by pyrolytically in a carbon black furnace decomposing a hydrocarbon feedstock having a carbon residue of less than 0.2 weight percent such as to form a smoke containing a carbon black, severely aftertreating said smoke by subjecting it to at least one of the steps of late quenching and secondary air injection, oxidizing said carbon black and pelleting the carbon black and an aqueous pelleting liquid and drying the wet carbon black pellets at a temperature of about 500° to about 600° F., said carbon black being characterized by having a CTAB surface area of less than 80 square meters per gram, a pitting degree of 0.2 square meters per gram or more, said pitting degree being defined as the difference between the nitrogen surface area in square meters per gram and the CTAB surface area in square meters per gram, a photelometer of 100% and a content of benzene extractables of less than 0.05 weight percent.

6. A polymer composition consisting essentially of 100 parts by weight of a polymer selected from the group of rubbers and thermoplastic polymers and 1 to 200 parts by weight of carbon black of claim 5 per 100 parts by weight of rubber and 0.1 to 50 parts by weight of carbon black per 100 parts by weight of thermoplastic polymer.

7. A composition in accordance with claim 6 comprising 20 to 80 parts by weight of carbon black and 100 parts by weight of rubber.

* * * * *